United States Patent [19]

Ochiai

[11] Patent Number: 4,654,534

[45] Date of Patent: * Mar. 31, 1987

[54] RADIATION IMAGE STORAGE PANEL

[75] Inventor: Takeji Ochiai, Minamiashigara, Japan

[73] Assignee: Fuji Photo Film Co., Ltd., Kanagawa, Japan

[*] Notice: The portion of the term of this patent subsequent to Feb. 26, 2002 has been disclaimed.

[21] Appl. No.: 659,434

[22] Filed: Oct. 10, 1984

Related U.S. Application Data

[62] Division of Ser. No. 441,744, Nov. 15, 1982, Pat. No. 4,508,636.

[30] Foreign Application Priority Data

Nov. 20, 1981 [JP] Japan .................................. 56-187501

[51] Int. Cl.$^4$ ........................................... H05B 33/00
[52] U.S. Cl. .............................. 250/484.1; 250/327.2
[58] Field of Search ............... 250/484.1, 483.1, 486.1, 250/327.2

[56] References Cited

U.S. PATENT DOCUMENTS 4,261,854 4/1981 Kotera et al. .................... 250/484.1
4,501,971 2/1985 Ochiai ............................. 250/483.1

OTHER PUBLICATIONS

Aramu, et al, "On the Thermoluminescence of Textile Fibers" Journal of Lum. 3, pp. 438–446 (1971).

*Primary Examiner*—Carolyn E. Fields
*Assistant Examiner*—Richard Hanig
*Attorney, Agent, or Firm*—Gerald J. Ferguson, Jr.; Michael P. Hoffman; Ronni S. Malamud

[57] ABSTRACT

A radiation image storage panel comprising a substrate and a fluorescent layer provided thereon and consisting essentially of a binder and a stimulable phosphor dispsersed therein. The binder comprises linear polyester resin or linear polyester resin crosslinked with a crosslinking agent. The panel exhibits improved physical properties.

4 Claims, No Drawings

RADIATION IMAGE STORAGE PANEL

This is a divisional application of Ser. No. 441,744 filed Nov. 15, 1982, U.S. Pat. No. 4,508,636.

BACKGROUND OF THE INVENTION

1. Field of the Invention

This invention relates to a radiation image storage panel for recording and reproducing a radiation image using a stimulable phosphor which stores radiation energy and emits light upon stimulation thereof, and more particularly to a radiation image storage panel exhibiting improved physical properties in which a stimulable phosphor is dispersed in a binder comprising linear polyester resin or liner polyester resin crosslinked with a crosslinking agent to form a fluorescent layer.

2. Description of the Prior Art

A novel method for obtaining a radiation image is disclosed, for example, in U.S. Pat. Nos. 3,859,527, 4,236,078 and 4,258,264. In the method of the patents, there is used a radiation image storage panel comprising a stimulable phosphor which emits light when stimulated by an electromagnetic wave selected from among visible light and infrared rays after exposure to a radiation. (The term "radiation" as used herein means electromagnetic wave or corpuscular radiation such as X-rays, γ-rays, β-rays, γ-rays, high energy neutron rays, cathode rays, vacuum ultraviolet rays, ultraviolet rays, or the like.) The method comprises the steps of (i) causing the stimulable phosphor of the panel to absorb a radiation passing through an object, (ii) scanning the panel with an electromagnetic wave such as visible light or infrared rays (hereinafter referred to as "stimulating rays") to sequentially release the radiation energy stored in the panel as light emission, and (iii) electrically converting the emitted light into an image.

The radiation image storage panel employed in the above-mentioned method for recording and reproducing a radiation image comprises a substrate and a fluorescent layer provided thereon. The fluorescent layer comprises a binder and a stimulable phosphor dispersed therein. Usually, a protective layer for physically and chemically protecting the fluorescent layer is provided on the naked surface of the fluorescent layer. Further, a primer layer is sometimes provided between the fluorescent layer and the substrate to closely bond the fluorescent layer to the substrate.

The radiation image storage panel having the above-mentioned structure is generally prepared by the following manufacturing process.

A stimulable phosphor is mixed with a binder in a suitable mixing ratio using a suitable solvent to prepare a dispersion in which the stimulable phosphor is dispersed in a solution of the binder. Then, the dispersion thus obtained is uniformly applied to a substrate by means of a doctor blade, a roll coater, a knife coater, or the like and dried to form a fluorescent layer. In the preparation of the radiation image storage panel having a primer layer between the substrate and the fluorescent layer, the primer layer is provided on the substrate beforehand, and then the dispersion is applied to the primer layer and dried to form the fluorescent layer. After the formation of the fluorescent layer, a protective layer for protecting the fluorescent layer is generally provided on the fluorescent layer. Unless otherwise indicated, the term "substrate" as used herein also means a substrate on one surface of which an intermediate layer such as the primer layer mentioned above or the light-reflecting layer described hereinbelow which is located between the substrate and the fluorescent layer in the panel to be obtained is provided beforehand.

The radiation image storage panel is incorporated in a radiation image recording device in the recording step of the above-mentioned method for recording and reproducing a radiation image. The panel is also incorporated in a radiation image read out device in the reproduction step of the method. Therefore, it is desired for the radiation image storage panel to have a high flexing resistance and a high adhesion of fluorescent layer to substrate. That is, the fluorescent layer of the radiation image storage panel should not readily craze and peel off from the substrate when the panel is bended.

The radiation image storage panel is exposed to stimulating rays in the reproduction step. Further, after the reproduction of radiation image, the panel is exposed to a light to remove the radiation energy remaining in the panel as disclosed in Japanese Unexamined Patent Publication No. 11,392/1981. (The light for removing the radiation energy remaining in the panel is hereinafter referred to as "erasing rays".) Since the radiation image storage panel is repeatedly used, the panel is repeatedly exposed to stimulating rays and erasing rays over a long period of time. Therefore, it is desired for the radiation image storage panel to have a high resistance to stimulating rays and erasing rays. That is, the sensitivity and the flexing resistance of the radiation image storage panel should not be readily lowered when the panel is exposed to stimulating rays or erasing rays for a long period of time. Accordingly, a material which is difficult to be yellowed by stimulating rays or erasing rays and therefore, hardly absorbs stimulating rays and/or the light emitted by the stimulable phosphor and hardly reduces the sensitivity of the panel should be used as the binder of the fluorescent layer of the panel. Further, a material which is difficult to be further cured by stimulating rays or erasing rays and therefore, hardly reduces the flexing resistance of the panel should be used as the binder.

The above-mentioned structure of the radiation image storage panel is almost the same as that of a radiographic intensifying screen except that a stimulable phosphor is used in place of a radioluminescent phosphor. In the conventional radiographic intensifying screen, cellulose derivatives such as nitrocellulose and cellulose acetate have been practically used as the binder of the fluorescent layer of the screen. Accordingly, it is intended to use these cellulose derivatives as the binder of the fluorescent layer of the radiation image storage panel.

In a dispersion for forming a fluorescent layer of a radiation image storage panel in which cellulose derivative is employed as the binder of the fluorescent layer, a stimulable phosphor is dispersed uniformly. However, the radiation image storage panel prepared by using the dispersion exhibits low performance in flexing resistance and adhesive force of fluorescent layer to substrate. Accordingly, the fluorescent layer of the panel readily crazes and peels off from the substrate when the panel is bended. Further, the radiation image storage panel in which cellulose derivative is employed as the binder of the fluorescent layer exhibits low performance in resistance to stimulating rays and erasing rays. That is, the cellulose derivative employed as the binder of the fluorescent layer of the panel is easily yellowed by stimulating rays or erasing rays, and therefore, the sensitivity of the panel is remarkably lowered when the panel is exposed to stimulating rays or erasing rays for a long period of time. Further, the cellulose derivative is further cured by stimulating rays or erasing rays, and therefore, the flexing resistance of the panel is also lowered by exposure to stimulating rays or erasing rays.

As described above, the radiation image storage panel in which cellulose derivative is used as the binder of the fluorescent layer exhibits low performance in flexing resistance, adhesion of fluorescent layer to substrate, and resistance to stimulating rays and erasing rays. Accordingly, a radiation image storage panel exhibiting higher performance in flexing resistance, adhesion of fluorescent layer to substrate, and resistance to stimulating rays and erasing rays than the radiation image storage panel in which cellulose derivative is used as the binder of the fluorescent layer is desired.

SUMMARY OF THE INVENTION

In view of the above-mentioned circumstances, an object of the present invention is to provide a radiation image storage panel exhibiting higher performance in flexing resistance, adhesion of fluorescent layer to substrate, and resistance to stimulating rays and erasing rays than the radiation image storage panel in which cellulose derivative is used as the binder of the fluorescent layer.

In order to accomplish the above-mentioned object, the inventors of the present invention conducted various investigations in searching for a material suitable as the binder of the fluorescent layer of the radiation image storage panel. As a result of the investigations, it was found that a radiation image storage panel exhibiting higher performance in flexing resistance, adhesion of fluorescent layer to substrate, and resistance to stimulating rays and erasing rays than the radiation image storage panel in which cellulose derivative is used as the binder of the fluorescent layer can be obtained by using linear polyester resin as the binder of the fluorescent layer. Further, it was found that a radiation image storage panel generally exhibiting higher performance in flexing resistance, adhesion of fluorescent layer to substrate, and resistance to stimulating rays and erasing rays than the above-mentioned radiation image storage panel in which linear polyester resin is used as the binder of the fluorescent layer can be obtained by using linear polyester resin crosslinked with a crosslinking agent as the binder of the fluorescent layer. Furthermore, it was found that a dispersion for forming a fluorescent layer in which a stimulable phosphor is dispersed uniformly can be obtained by preparing a dispersion using as the binder a mixture of linear polyester resin and nitrocellulose, or a mixture of linear polyester resin crosslinked with crosslinking agent and nitrocellulose, and that the radiation image storage panel prepared by using the dispersion exhibits high performance in mechanical strength of edge faces of fluorescent layer in addition to high performance in flexing resistance, adhesion of fluorescent layer to substrate, and resistance to stimulating rays and erasing rays.

The first radiation image storage panel of the present invention comprises a substrate and a fluorescent layer provided on the substrate and consisting essentially of a binder and a stimulable phosphor dispersed therein, characterized in that the binder comprises linear polyester resin.

The second radiation image storage panel of the present invention comprises a substrate and a fluorescent layer provided on the substrate and consisting essentially of a binder and a stimulable phosphor dispersed therein, characterized in that the binder comprises linear polyester resin crosslinked with a crosslinking agent.

Among the binders employed in the present invention, the binder containing nitrocellulose together with linear polyester resin or with linear polyester resin crosslinked with a crosslinking agent is most preferable. As described above, in the radiation image storage panel manufacturing process, the binder provides a dispersion in which a stimulable phosphor is dispersed uniformly. Further, the radiation image storage panel in which the binder is employed in the fluorescent layer exhibits high performance in mechanical strength of edge faces of fluorescent layer in addition to high performance in flexing resistance, adhesion of fluorescent layer to substrate, and resistance to stimulating rays and erasing rays.

DETAILED DESCRIPTION OF THE INVENTION

The present invention will be described in detail hereinbelow.

Linear polyester resin employed as the binder of the fluorescent layer of the radiation image storage panel of the present invention has been well known. The resin can be obtained by polycondensation reaction of dihydroxy compound with dibasic acid or by polyaddition reaction of oxyacid.

Examples of the above-mentioned dihydroxy compound include ethylene glycol, 1,3-propanediol, 1,4-butanediol, 1,4cyclohexanedimethanol, or the like. Further, examples of the above-mentioned dibasic acid include succinic acid, glutaric acid, adipic acid, terephthalic acid, isophthalic acid, or the like. Furthermore, examples of the above-mentioned oxyacid include glycolic acid, lactic acid, malic acid, tartaric acid, citric acid, salicylic acid, benzoic acid, gallic acid, mandelic acid, tropic acid, or the like.

Various linear polyester resins are commercially available. In the present invention, it is convenient to use these commercially available linear polyester resins. Examples of the commercially available linear polyester resins include Vylon 300, Vylon 500, Vylon 30p, Vylon 250, Vylon 90, Vylon 200, Vylon 103 (all manufactured by Toyobo Co., Ltd.), or the like.

The binder employed in the radiation image storage panel of the present invention may be linear polyester resin crosslinked with a crosslinking agent. Generally, the radiation image storage panel in which linear polyester resin crosslinked with a crosslinking agent is used as the binder exhibits higher performance in flexing resistance, adhesion of fluorescent layer to substrate, and resistance to stimulating rays and erasing rays than the radiation image storage panel in which linear polyester resin is used as the binder.

The crosslinking agent to crosslink the above linear polyester resin may be any compound provided the compound can crosslink the terminal hydroxy group of the linear polyester resin. In particular, diisocyanate should preferably be used as the crosslinking agent. Examples of the diisocyanate used as the crosslinking agent include polymethylene diisocyanate such as ethylene diisocyanate, trimethylene diisocyanate, tetramethylene diisocyanate, hexamethylene diisocyanate, or the like; aromatic diisocyanate such as p-phenylene diisocyanate, tolylene diisocyanate, p,p'-diphenylmethane diisocyanate, 1,5-naphthylene diisocyanate, or the like; m-xylylene diisocyanate, or the like. The amount of the crosslinking agent used is not particularly limited. In general, the amount of the crosslinking agent is within the range of 0.1 to 10 parts by weight, and preferably within the range of 1 to 4 parts by weight, per 100 parts by weight of the linear polyester resin.

The radiation image storage panel in which linear polyester resin or linear polyester resin crosslinked with a crosslinking agent is used as the binder exhibits higher performance in flexing resistance, adhesion of fluorescent layer to substrate, and resistance to stimulating rays and erasing rays than the radiation image storage panel in which cellulose derivative is used as the binder. However, the mechanical strength of the edge faces of the fluorescent layer of the former radiation image storage panel is lower than that of the latter radiation image storage panel, and the edge faces of the fluorescent layer of the former radiation image storage panel are easily damaged by the mechanical shock given thereon during the use of the panel. This is because linear polyester resin or linear polyester resin crosslinked with a crosslinking agent is more flexible than cellulose derivative.

Further, the dispersing property of the stimulable phosphor in the dispersion prepared by using linear polyester resin or by using linear polyester resin and a crosslinking agent is relatively low, and the dispersing property is lower than that of the stimulable phosphor in the dispersion prepared by using cellulose derivative.

The above-mentioned disadvantageous physical properties brought by the use of polyester resin or linear polyester resin crosslinked with a crosslinking agent as the binder can be reformed by using nitrocellulose together with linear polyester resin or with linear polyester resin crosslinked with a crosslinking agent as the binder. That is, a radiation image storage panel exhibiting high performance in mechanical strength of edge faces of fluorescent layer in addition to high performance in flexing resistance, adhesion of fluorescent layer to substrate, and resistance to stimulating rays and erasing rays can be obtained by using a mixture of linear polyester resin and nitrocellulose, or a mixture of linear polyester resin crosslinked with a crosslinking agent and nitrocellulose as the binder. Further, the dispersing property of the stimulable phosphor in the dispersion can be improved by using the mixture as the binder.

When nitrocellulose is used together with linear polyester resin or with linear polyester resin crosslinked with a crosslinking agent, the nitrocellulose should preferably have a nitration degree ranging from 10.7 to 12.2%, and more preferably have a nitration degree ranging from 11.5 to 12.2%. Further, the mixing weight ratio between the linear polyester resin and the nitrocellulose, or between the linear polyester resin crosslinked with a crosslinking agent and the nitrocellulose is generally within the range of 60:40 to 95:5, and should preferably be within the range of 80:20 to 95:5.

The radiation image storage panel of the present invention is prepared by the following manufacturing process.

A stimulable phosphor is mixed with the above-mentioned binder using a suitable solvent to prepare a dispersion in which the stimulable phosphor is dispersed in the binder. When linear polyester resin crosslinked with a crosslinking agent is used as the binder, the linear polyester resin and the crosslinking agent are mixed with the stimulable phosphor. Further, when nitrocellulose is used together with linear polyester resin or with linear polyester resin crosslinked with a crosslinking agent, the linear polyester resin and the nitrocellulose, or the linear polyester resin, the crosslinking agent and the nitrocellulose are mixed with the stimulable phosphor.

For example, as the above-mentioned solvent, there can be used alcohol such as methanol, ethanol, n-propanol, n-butanol, or the like; alkylene chloride such as methylene chloride, ethylene chloride, or the like; ketone such as acetone, methyl ethyl ketone, methyl isobutyl ketone, or the like; ester such as methyl acetate, ethyl acetate, butyl acetate, or the like; ether such as monoethyl ether and monomethyl ether of dioxane and ethylene glycol; and mixtures thereof.

For example, the stimulable phosphor employed in the present invention includes (a) SrS:Ce, Sm, SrS:Eu,Sm, La$_2$O$_2$S: Eu,Sm and (Zn,Cd)S:Mn, X wherein X is halogen, which are described in the above-mentioned U.S. Pat. No. 3,859,527; (b) ZnS:Cu,Pb, BaO.xAl$_2$O$_3$Eu wherein x is a number satisfying the condition of $0.8 \leq x \leq 10$, M$^{II}$O.xSiO$_2$:A wherein M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, and LnOX:xA wherein Ln is at least one element selected from the group consisting of La, Y, Gd and Lu, X is Cl and/or Br, A is Ce and/or Tb, and x is a number satisfying the condition of $0 < x \leq 0.1$, which are described in the above-mentioned U.S. Pat. No. 4,236,078; (c) (Ba$_{1-x}$, M$^{II}_x$)FX:yA wherein M$^{II}$ is at least one divalent metal selected from the group consisting of Mg, Ca, Sr, Zn and Cd, X is at least one halogen selected from the group consisting of Cl, Br and I, A is at least one rare earth element selected from the group consisting of Eu, Tb, Ce, Tm, Dy, Pr, Ho, Nd, Yb and Er, and x and y are numbers satisfying the conditions of $0 \leq x \leq 0.6$ and $0 < y \leq 0.1$, respectively, which is described in U.S. Pat. No. 4,239,968; (d) (Ba$_{1-x-y}$, Mg$_x$, Ca$_y$)FX: aEu$^{2+}$ wherein X is at least one halogen selected from the group consisting of Cl, Br and I, and x, y and a are numbers satisfying the conditions of $0 < x+y \leq 0.6$, $xy \neq 0$ and $10^{-6} \leq a \leq 5 \times 10^{-2}$, which is described in Japanese Unexamined Patent Publication No. 12,143/1980; (e) BaFX: xCe, yA wherein X is at least one halogen selected from the group consisting of Cl, Br and I, A is at least one element selected from the group consisting of In, Ta, Gd, Sm and Zr, and x and y are numbers satisfying the conditions of $0 < x \leq 2 \times 10^{-1}$ and $0 < y \leq 5 \times 10^{-2}$, respectively, which is described in U.S. Pat. No. 4,261,854; (f) BaF$_2$.aBaX$_2$.bMe$^I$F.cMe$^{II}$F$_2$.dMe$^{III}$F$_3$:eLn wherein X is at least one halogen selected from the group consisting of Cl, Br and I, Me$^I$ is Li and/or Na, Me$^{II}$ is at least one divalent metal selected from the group consisting of Be, Ca and Sr, Me$^{III}$ is at least one trivalent metal selected from the group consisting of Al, Ga, Y and La, Ln is at least one rare earth element selected from the group consisting of Eu, Ce and Tb, and a, b, c, d and e are numbers satisfying the conditions of $0.90 \leq a \leq 1.05$, $0 \leq b \leq 0.9$, $0 \leq c \leq 1.2$, $0 \leq d \leq 0.03$, $10^{-6} \leq e \leq 0.03$ and $b+c+d \neq 0$, which is described in Japanese Unexamined Patent Publication No. 2,386/1981; (g) a phosphor obtained by adding MgF$_2$ to the above-mentioned phosphor (f), which is described in Japanese Unexamined Patent Publication No. 238/1981; (h) BaFX.aLiX'.bBeX$_2$''.-

$CM^{III}X_3''':dA$ wherein each of X, X', X" and X'" is at least one halogen selected from the group consisting of Cl, Br and I, $M^{III}$ is Al and/or Ga, A is at least one rare earth element selected from the group consisting of Eu, Tb, Ce, Tm, Dy, Pr, Ho, Nd, Yb, Er, Gd, Lu, Sm and Y, and a, b, c and d are numbers satisfying the conditions of $0 \leq a \leq 0.1$, $0 \leq b \leq 0.1$, $0 \leq c \leq 0.1$, $10^{-6} \leq d \leq 0.2$ and $0 \leq a+b+c \leq 0.1$, which is described in Japanese Unexamined Patent Publication No. 74,175/1981; or the like. However, the stimulable phosphor which can be employed in the radiation image storage panel of the present invention is not limited to the above-mentioned phosphors, and any phosphor can be employed in the present invention provided that the phosphor emits light when exposed to stimulating rays after exposure to a radiation. From the viewpoint of practical use, the stimulable phosphor should preferably be a phosphor which emits light having a wavelength ranging from 300 to 600 nm when exposed to stimulating rays having a wavelength ranging from 450 to 1100 nm, particularly from 450 to 750 nm.

The mixing weight ratio between the binder and the stimulable phosphor in the dispersion depends upon the kind of stimulable phosphor and so forth. In general, the mixing weight ratio between the binder and the stimulable phosphor is within the range of 1:200 to 1:10, and should preferably be within the range of 1:100 to 1:20.

Additives such as a dispersant for improving the dispersing property of the stimulable phosphor in the dispersion and a plasticizer for improving the bonding force between the binder and the stimulable phosphor in the fluorescent layer of the radiation image storage panel to be obtained may be contained in the dispersion. For example, as the above-mentioned dispersant, there can be used phthalic acid, stearic acid, caproic acid, lipophilic surfactants, or the like. As the above-mentioned plasticizer, there can be used phosphate ester such as triphenyl phosphate, tricresyl phosphate, diphenyl phosphate, or the like; phthalate ester such as diethyl phthalate and dimethoxyethyl phthalate; glycolate ester such as ethyl phthalyl ethyl glycolate and butyl phthalyl butyl glycolate; or the like.

As disclosed in Japanese Unexamined Patent Publication No. 146,447/1980, the sharpness of the radiation image storage panel can be improved by dispersing a white powder in the fluorescent layer of the panel. Further, as disclosed in Japanese Unexamined Patent Publication No. 163,500/1980, the sharpness of the radiation image storage panel can also be improved by dispersing a colorant in the fluorescent layer of the panel and coloring the fluorescent layer with the colorant. Accordingly, also in the present invention, the sharpness of the radiation image storage panel to be obtained can be improved by further dispersing a white powder or a colorant in the above-mentioned dispersion and then forming the fluorescent layer in which the white powder or the colorant is dispersed together with the stimulable phosphor in the manner as mentioned below using the dispersion. The dispersion for forming the colored fluorescent layer may be prepared by having the colorant adhere to the surface of the stimulable phosphor particles beforehand and then dispersing the colorant coated stimulable phosphor in the binder in the manner as mentioned above.

Then, the above-mentioned dispersion is uniformly applied to a substrate by means of a doctor blade, a roll coater, a knife coater, or the like to form a coating of the dispersion thereon. For example, as the substrate, there can be used ordinary paper; processed paper such as baryta paper, resin-coated paper, pigment containing paper which contains a pigment such as titanium dioxide, sized paper which is sized with polyvinyl alcohol, or the like; sheet of macromolecular material such as polyethylene, polypropylene, polyester such as polyethylene terephthalate, or the like; and metallic sheet such as aluminum foil, aluminum alloy foil, or the like.

The surface of the substrate to which the dispersion is applied may be processed beforehand, for example, by applying thereto gelatin. When the substrate used is permeable to stimulating rays, it is possible to expose the radiation image storage panel to be obtained to stimulating rays from the side opposite to the fluorescent layer side. Further, as disclosed in the above-mentioned Japanese Unexamined Patent Publication No. 163,500/1980, the sharpness of the radiation image storage panel to be obtained can be improved by using a substrate which is colored with a colorant.

In the radiation image storage panel of the present invention, a primer layer for closely bonding the fluorescent layer to the substrate may be provided between the fluorescent layer and the substrate. Further, a light-reflecting layer for improving the sharpness of the panel may be provided between the fluorescent layer and the substrate in accordance with the teaching of Japanese Unexamined Patent Publication No. 12,600/1981 or No. 11,393/1981. When the radiation image storage panel having an intermediate layer such as the above-mentioned primer layer or light-reflecting layer is manufactured, the intermediate layer is provided on the above-mentioned substrate beforehand, and then the composite obtained is used as a "substrate". In this case, it is needless to say that the dispersion is applied to the intermediate layer.

The primer layer can be provided on the substrate by applying thereto an ordinary adhesive. As disclosed in the above-mentioned Japanese Unexamined Patent Publication No. 163,500/1980, the sharpness of the radiation image storage panel to be obtained can be improved by providing on the substrate a primer layer which is colored with a colorant. The light-reflecting layer can be provided on the substrate by vacuum deposition of a metal such as aluminum, lamination of a metallic foil such as an aluminum foil, or application of a dispersion which comprises a binder and a white powder such as titanium dioxide, aluminum oxide, barium sulfate, or the like dispersed therein. (The binder employed in this dispersion may be the same as employed in the fluorescent layer.)

After the formation of the coating of the dispersion, the coating is heated and dried to form a fluorescent layer on the substrate. When the binder in the fluorescent layer to be formed comprises linear polyester resin crosslinked with a crosslinking agent, the linear polyester resin crosslinked with a crosslinking agent is produced during the heating by the reaction of the linear polyester resin contained in the coating with the crosslinking agent also contained therein. The thickness of the fluorescent layer is properly determined depending on the kind of stimulable phosphor, the mixing ratio between the binder and the stimulable phosphor and so forth. In general, the thickness of the fluorescent layer is within the range of 20 μm to 1 mm, and preferably within the range of 100 to 500 μm.

In the radiation image storage panel of the present invention, a protective layer for physically and chemically protecting the fluorescent layer is generally provided on the naked surface of the fluorescent layer (the side opposite to the substrate). For example, the protective layer can be provided on the fluorescent layer by dissolving a resin such as cellulose derivative such as cellulose acetate and nitrocellulose, polymethyl methacrylate, polyvinyl butyral, polyvinyl formal, polycarbonate, polyvinyl acetate, vinyl chloride-vinyl acetate copolymer or the like in a suitable solvent to prepare a solution of the resin, applying the solution to the naked surface of the fluorescent layer, and then drying the coating of the solution. Alternatively, the protective layer can be provided thereon by bonding thereto a thin film such as polyethylene terephthalate film, polyethylene film, vinylidene chloride film, nylon film, or the like with a suitable adhesive. The thickness of the protective layer should preferably be within the range of 3 to 20 μm. Needless to say, the protective layer should be permeable to the light emitted by the stimulable phosphor contained in the fluorescent layer and when the radiation image storage panel is exposed to stimulating rays from the protective layer side, the protective layer should be permeable to stimulating rays (In general, the radiation image storage panel is exposed to stimulating rays from the protective layer side.) As disclosed in the above-mentioned Japanese Unexamined Patent Publication No. 163,500/1980, the sharpness of the radiation image storage panel to be obtained can be improved by providing a protective layer which is colored with a colorant.

As shown in the example described below, the radiation image storage panel of the present invention exhibits higher performance in flexing resistance, adhesion of fluorescent layer to substrate, and resistance to stimulating rays and erasing rays than the radiation image storage panel in which cellulose derivative is used as the binder. In particular, the radiation image storage panel of the present invention in which the mixture of linear polyester resin and nitrocellulore, or the mixture of linear polyester resin crosslinked with a crosslinking agent and nitrocellulose is used as the binder exhibits high performance in mechanical strength of edge faces of fluorescent layer in addition to high performance in flexing resistance, adhesion of fluorescent layer to substrate, and resistance to stimulating rays and erasing rays. Further, when the mixture of linear polyester resin and nitrocellulose, or the mixture of linear polyester resin crosslinked with a crosslinking agent and nitrocellulose is used as the binder, a dispersion for forming a fluorescent layer in which stimulable phosphor is dispersed uniformly can be obtained in the preparation of the radiation image storage panel.

The present invention will hereinbelow be described referring to the following example.

EXAMPLE

Divalent europium activated barium fluorobromide phosphor (BaFBr:Eu$^{2+}$) was prepared. The particles having a particle size not less than 15 μm contained in the BaFBr:Eu$^{2+}$ phosphor were removed by classification.

On the one hand, linear polyester resin (a mixture of Vylon 500 and Vylon 200 in a mixing weight ratio of 17:3) was prepared.

Then, 89.9 parts by weight of the linear polyester resin (28.1 parts by weight of resin content) were added to 500 parts by weight of the classified BaFBr:Eu$^{2+}$ phosphor to obtain a suspension, and then 55 parts by weight of methyl ethyl ketone were added to the suspension to wet the suspension. Thereafter, 1.3 parts by weight of tolylene diisocyanate and 41.3 parts by weight of nitrocellulose having a nitration degree of 11.5% (3.1 parts by weight of resin content) were added to the wet suspension and mixed therewith by hand stirring. Further, to the resultant, 0.5 parts by weight of tricresyl phosphate, 5.7 parts by weight of n-butanol and 20 parts by weight of methyl ethyl ketone were added and mixed therewith thoroughly by means of a propeller mixer to prepare a dispersion having a viscosity ranging from 25 to 35 ps at 25° C. in which the BaFBr:Eu$^{2+}$ phosphor is dispersed uniformly. The dispersion thus obtained was designated "Dispersion No. 1". As is clear from the above, the composition of Dispersion No. 1 was as follows.

| | |
|---|---|
| BaFBr:Eu$^{2+}$ phosphor | 500 parts by weight |
| Linear polyester resin | 28.1 parts by weight |
| Tolylene diisocyanate | 1.3 parts by weight |
| Nitrocellulose | 3.1 parts by weight |
| Tricresyl phosphate | 0.5 parts by weight |
| n-Butanol | 5.7 parts by weight |
| Methyl ethyl ketone | 75 parts by weight |

Then, Dispersion No. 1 was uniformly applied to a carbon-incorporated polyethylene terephthalate sheet having a thickness of 250 μm (substrate) which was placed on a glass plate positioned horizontally by means of a doctor blade to form a coating of the dispersion. Thereafter, the coating was dried at room temperature for 30 minutes under windless condition and then, further dried at a temperature of 90° C. for 10 minutes under the condition of a wind velocity of 0.2 m/sec to form a fluorescent layer having a thickness of 200 μm on the substrate. The radiation image storage panel thus obtained was designated "Panel No. 1".

Separately, Dispersions No. 2, No. 3, No. 4 and No. 5 having the composition shown in Table 1 below were prepared in the same manner as mentioned above, and Panels No. 2, No. 3, No. 4 and No. 5 having a fluorescent layer of almost the same thickness as the fluorescent layer of Panel No. 1 were manufactured in the same manner as mentioned above using Dispersions No. 2, No. 3, No. 4 and No. 5, respectively. Panel No. 5 was manufactured as a reference. The amount of each constituent of the compositions shown in Table 1 below is expressed on part by weight basis.

TABLE 1

| Dispersion No. | BaFBr:Eu$^{2+}$ Phosphor | *Linear Polyester Resin | Tolylene Diisocyanate | Nitro-cellulose | Tricresyl Phosphate | n-Butanol | Methyl Ethyl Ketone |
|---|---|---|---|---|---|---|---|
| 1 | 500 | 28.1 | 1.3 | 3.1 | 0.5 | 5.7 | 75 |
| 2 | 500 | 28.1 | 1.3 | — | 0.5 | 5.7 | 75 |
| 3 | 500 | 28.1 | — | 3.1 | 0.5 | 5.7 | 75 |
| 4 | 500 | 28.1 | — | — | 0.5 | 5.7 | 75 |

TABLE 1-continued

| Dispersion No. | BaFBr:Eu$^{2+}$ Phosphor | *Linear Polyester Resin | Tolylene Diisocyanate | Nitro-cellulose | Tricresyl Phosphate | n-Butanol | Methyl Ethyl Ketone |
|---|---|---|---|---|---|---|---|
| 5 | 500 | — | — | 28.1 | 0.5 | 5.7 | 75 |

*A mixture of Vylon 500 and Vylon 200 (both manufactured by Toyobo Co., Ltd.) in a mixing weight ratio of 17:3.

Then, the flexing resistance, adhesion of fluorescent layer to substrate, resistance to stimulating rays and erasing rays, and mechanical strength of edge faces of fluorescent layer of Panels No. 1 to No. 5 were evaluated. The dispersing property of the stimulable phosphor (BaFBr:Eu$^{2+}$ phosphor) in Dispersions No. 1 to No. 5 was also evaluated. The results are shown in Table 2 below. The evaluation of the above-mentioned physical properties was conducted by the following testings.

(1) Testing of flexing resistance

A rectangular test piece of radiation image storage panel having a width of 30 mm and a length of 50 mm was positioned so that the fluorescent layer thereof faced upwards. The lengthwise half of the test piece was fixed with a stainless steel clamp plate, and the unfixed portion of the test piece was gradually bended. When craze arose in the fluorescent layer, the angle $\theta$ 8 between the clamp plate and the bended test piece was measured by a protractor. A larger $\theta$ value means a higher flexing resistance. In Table 2 below, the flexing resistance of Panels No. 1 to No. 5 is evaluated with the three ranks of x, $\Delta$ and o. The marks x, $\Delta$ and o represent $\theta$ values within the ranges of $0° < \theta \leq 50°$, $50° < \theta \leq 90°$ and $90° < \theta \leq 180°$, respectively.

(2) Testing of adhesion of fluorescent layer to substrate

A rectangular test piece of radiation image storage panel having a width of 10 mm and a length of 60 mm was prepared, and the fluorescent layer of the test piece was backed up with a adhesive polyester tape by applying thereto the tape. Then, the fluorescent layer backed up with the adhesive polyester tape was caused to peel off from the substrate in length of 10 mm to the lengthwise direction of the test piece. Thereafter, the separated fluorescent layer and substrate were pulled to opposite directions by means of Tensilon (UTM-11-20, manufactured by Toyo Baldwin Co., Ltd.) at a pulling rate of 20 mm/min. The force F (gram) needed to cause the fluorescent layer to peel off from the substrate in length of 10 mm was measured. A larger F value means a higher adhesion of fluorescent layer to substrate. In Table 2 below, the adhesion of fluorescent layer to substrate in Panels No. 1 to No. 5 is evaluated with the three ranks of x, $\Delta$ and o. The marks x, $\Delta$ and o represent F values within the ranges of 0 gram $< F \leq 50$ grams, 50 grams $< F \leq 100$ grams and 100 grams $< F$, respectively.

(3) Testing of resistance to stimulating and erasing rays

A fluorescent lighting of 20 W which emits white light containing stimulating rays and erasing rays was located at a distance of 10 cm from a radiation image storage panel, and the panel was exposed to the white light emitted by the fluorescent lighting at an illuminance of 15,000 luxes for 100 hours. The amount of the light emitted by the panel upon stimulation thereof was measured before and after the above-mentioned exposure, and the ratio $\tau$ (%) of the amount of light measured after the exposure to the amount of light measured before the exposure was calculated. A smaller $\tau$ value means a higher degree of yellowing of the binder used in the panel by stimulating rays and erasing rays, and therefore, means a lower resistance of the binder to stimulating rays and erasing rays. The measurement of the amount of the light emitted by the panel upon stimulation thereof was performed by exposing the panel to X-rays of 80 KVp, stimulating the panel with a He-Ne laser beam (633 nm) and measuring the luminance of the light emitted by the panel. In Table 2 below, the resistance of Panels No. 1 to No. 5 to stimulating rays and erasing rays is evaluated with the three ranks of x, $\Delta$ and o. The marks x, $\Delta$ and o represent $\tau$ values within the ranges of $0\% < \tau \leq 76\%$, $76\% < \tau \leq 86\%$ and $86\% < \tau \leq 100\%$, respectively.

Further, the flexing resistance of the above-mentioned panel which had been exposed to the white light for 100 hours was evaluated in the same manner as mentioned in the above Testing (1). When the $\theta$ value obtained in this testing is compared with the $\theta$ value obtained in Testing (1), a higher degree of decrease in $\theta$ value means a higher degree of curing of the binder by stimulating rays and erasing rays, and therefore, means a lower resistance of the binder to stimulating rays and erasing rays. In Table 2 below, the flexing resistance of Panels No. 1 to No. 5 after the above-mentioned exposure is evaluated with the same three ranks of x, $\Delta$ and o as mentioned in Testing (1).

(4) Testing of mechanical strength of edge faces of fluorescent layer

A square test piece of radiation image storage panel having a size of 150 mm $\times$ 150 mm in one portion of which the fluorescent layer is removed from the substrate and the substrate is exposed was prepared. A stainless steel plate having an edge of a thickness of 0.5 mm and a width of 15 mm was caused to impinge upon the exposed section of the fluorescent layer perpendicularly thereto at a speed of 60 mm/min so that a force of 750 grams was exerted to the portion upon which the edge of the stainless steel plate impinged. Then, the length t (mm) of the crack which arose in the fluorescent layer and extended toward the same direction as of the movement of the stainless steel plate was measured by a slide gauge. A larger t value means a lower mechanical strength of edge faces of fluorescent layer. In Table 2 below, the mechanical strength of edge faces of fluorescent layer of Panels No. 1 to No. 3 is evaluated with the three ranks of x, $\Delta$ and o. The marks x, $\Delta$ and o represent t values within the ranges of 10 mm $< t$, 2 mm $< t \leq 10$ mm and 0 mm $< t \leq 2$ mm, respectively.

(5) Testing of dispersing property of stimulable phosphor in dispersion

A dispersion was applied to a grind gauge, and the grind gauge value l ($\mu$) of the dispersion was measured using a stainless steel blade. A larger l value means a lower dispersing property of stimulable phosphor in dispersion. In Table 2 below, the dispersing property of the stimulable phosphor contained in Dispersions No. 1 to No. 5 is evaluated with three ranks of x, $\Delta$ and o. The marks x, $\Delta$ and o represent l values within the ranges of $30\mu < l$, $15\mu < l \leq 30\mu$ and $0\mu < l \leq 15\mu$, respectively.

In the following Table 2, the parenthesized values are measured value.

adhesion of fluorescent layer to substrate, and resistance to stimulating rays and erasing rays. (Panel No. 1 exhib-

TABLE 2

| Panel and Dispersion No. | Flexing Resistance (°) | Adhesion of Fluorescent Layer to Substrate (g/10 mm) | Resistance to Stimulating Rays and Erasing Rays | | Mechanical Strength of Edge Faces of Fluorescent Layer (mm) | Dispersing Property of Stimulable Phosphor (μ) |
|---|---|---|---|---|---|---|
| | | | Ratio of Amount of Light Emission (%) | Flexing Resistance (°) | | |
| 1 | o (180) | o (250) | o (97) | o (150) | o (0.5) | o (8) |
| 2 | o (250) | o (200) | o (99) | o (220) | x (10) | x (35) |
| 3 | Δ (90) | Δ (90) | o (99) | Δ (80) | o (1) | o (9) |
| 4 | o (230) | o (210) | o (99) | o (180) | Δ (3) | x (42) |
| 5 | x (40) | x (30) | x (50) | x (30) | o (1) | o (8) |

As is clear from the above Tables 1 and 2, the radiation image storage panels of the present invention (Panels No. 1 to No. 4) exhibit higher performance in flexing resistance, adhesion of fluorescent layer to substrate, and resistance to stimulating rays and erasing rays than the radiation image storage panel in which nitrocellulose is used as the binder of the fluorescent layer (Panel No. 5). Among the radiation image storage panels of the present invention, the radiation image storage panels in which the binder comprising linear polyester resin crosslinked with a crosslinking agent is used (Panels No. 1 and No. 2) exhibit higher performance in flexing resistance, adhesion of fluorescent layer to substrate, and resistance to stimulating rays and erasing rays than the radiation image storage panels in which the binder comprising linear polyester resin is used (Panels No. 3 and No. 4), and in particular, the former exhibits remarkably higher performance in adhesion of fluorescent layer to substrate than the latter. Further, among the radiation image storage panels of the present invention, the radiation image storage panel in which the binder consisting solely of linear polyester resin is used (Panel No. 4) and the radiation image storage panel in which the binder consisting solely of linear polyester resin crosslinked with a crosslinking agent is used (Panel No. 2) exhibit low performance in mechanical strength of edge faces of fluorescent layer, and the mechanical strength of the edge faces of the fluorescent layer of these panels is remarkably lower than that of the radiation image storage panel in which nitrocellulose is used as the binder (Panel No. 5). However, in the radiation image storage panel in which nitrocellulose is used together with linear polyester resin as the binder (Panel No. 3) and the radiation image storage panel in which nitrocellulose is used together with linear polyester resin crosslinked with a crosslinking agent as the binder (Panel No. 1), the performance in mechanical strength of edge faces of fluorescent layer is remarkably improved. That is, the use of nitrocellulose together with linear polyester resin or with linear polyester resin crosslinked with a crosslinking agent is effective to remarkably improve the performance in machanical strength of edge faces of fluorescent layer without particularly lowering the performance in flexing resistance, its higher performance in adhesion of fluorescent layer to substrate than Panel No. 2.) Further, the dispersion prepared using linear polyester resin (Dispersion No. 4) and the dispersion prepared using linear polyester and a crosslinking agent (Dispersion No. 2) exhibit low performance in dispersing property of stimulable phosphor, and the dispersing property of the stimulable phosphor in these dispersions is lower than that of the stimulable phosphor in the dispersion prepared using nitrocellulose (Dispersion No. 5). However, in the dispersion prepared using nitrocellulose together with linear polyester resin (Dispersion No. 3) and the dispersion prepared using nitrocellulose together with linear polyester resin and a crosslinking agent (Dispersion No. 1), the performance in dispersing property of stimulable phosphor is remarkably improved. That is, the use of nitrocellulose together with linear polyester resin or with linear polyester and a crosslinking agent is effective to remarkably improve the performance in dispersing property of stimulable phosphor.

I claim:

1. A method of using a radiation image storage panel comprising a substrate and a fluorescent layer provided on said substrate, said fluorescent layer consisting essentially of a binder and a stimulable phosphor dispersed therein wherein said binder comprises linear polyester resin obtained by a polycondensation reaction of dihydroxy compound with dibasic acid or by polyaddition reaction of oxyacid, said method comprising the steps of
   (a) causing the stimulable phosphor of the panel to absorb a reaction passing through an object;
   (b) scanning the panel with an electromagnetic wave to sequentially release the radiation energy stored in the panel during step (a) as light emission; and
   (c) electrically converting the emitted light into an image.

2. The method as claimed in claim 1, wherein said linear polyester resin is crosslinked with a crosslinking agent.

3. The method as claimed in claim 1, wherein said binder further comprises nitrocellulose.

4. The method as claimed in claim 2, wherein said crosslinking agent is diisocyanate.

* * * * *